(12) United States Patent
Janevski et al.

(10) Patent No.: US 7,457,811 B2
(45) Date of Patent: Nov. 25, 2008

(54) PRECIPITATION/DISSOLUTION OF STORED PROGRAMS AND SEGMENTS

(75) Inventors: Angel Janevski, New York, NY (US); Nevenka Dimitrova, Yorktown Heights, NY (US); Lalitha Agnihotri, Fishkill, NY (US)

(73) Assignee: Pace PLC, Saltaire, West Yorkshire (GB)

( * ) Notice: Subject to any disclaimer, the term of this patent is extended or adjusted under 35 U.S.C. 154(b) by 1046 days.

(21) Appl. No.: 10/178,015

(22) Filed: Jun. 21, 2002

(65) Prior Publication Data

US 2003/0236762 A1 Dec. 25, 2003

(51) Int. Cl.
*G06F 17/00* (2006.01)

(52) U.S. Cl. .................. 707/101; 707/102; 707/103 R; 707/104.1

(58) Field of Classification Search ............... 707/1–10, 707/100–104.1, 200–206
See application file for complete search history.

(56) References Cited

U.S. PATENT DOCUMENTS

| | | | | |
|---|---|---|---|---|
| 5,596,705 | A | 1/1997 | Reimer et al. | 395/326 |
| 5,857,181 | A | 1/1999 | Augenbraun et al. | 707/2 |
| 5,999,975 | A | 12/1999 | Kittaka et al. | 709/224 |
| 6,092,074 | A * | 7/2000 | Rodkin et al. | 707/102 |
| 6,650,998 | B1 * | 11/2003 | Rutledge et al. | 707/3 |
| 2002/0040326 | A1 * | 4/2002 | Spratt | 705/26 |
| 2003/0126601 | A1 * | 7/2003 | Roberts et al. | 725/37 |

FOREIGN PATENT DOCUMENTS

| | | |
|---|---|---|
| EP | 1016991 A2 | 7/2000 |
| EP | 1052578 A2 | 11/2000 |
| EP | 1117056 A2 | 7/2001 |
| WO | WO9744746 | 11/1997 |
| WO | WO0137465 | 5/2001 |
| WO | WO0133839 | 5/2002 |

OTHER PUBLICATIONS

J.S. Jasinschi et al., "Video Scouting: An Architecture and System for the Integration of Multimedia Information in Persona; TV Applications", Proc. International Conference, Speech and Signal Processing, Salt Lake City 2001.

Dongge Li et al., "Fusion of Visual and Audio Features for Person Identification in real Video", SPIE 2001, San Jose.

L. Agnihotri et al, "Summarization of Video Programs Based on Closed Captions", SPIE 2001, San Jose, Jan. 24-27, pp. 599-607.

* cited by examiner

*Primary Examiner*—Isaac M Woo
(74) *Attorney, Agent, or Firm*—Nixon Peabody LLP

(57) ABSTRACT

A content maintenance system uses a time-dependent precipitation function for iteratively augmenting or removing content over time, after an initial demonstration of user interest. A plurality of parallel precipitation processes can be launched simultaneously in response to different facets of a user expression of interest. Precipitation is dependent on highlighting or extracting segment descriptors from content of interest to the user. Then segments are filtered, rated, annotated and/or prioritized from that content. The remaining segments are matched against stored search structures. When the segments match, they are precipitated out for storage and can generate new search structures.

25 Claims, 4 Drawing Sheets

PRECIPITATION/DISSOLUTION OF STORED PROGRAMS AND SEGMENTS

RELATED APPLICATIONS

The following patent and applications are incorporated herein by reference

U.S. patent application Ser. No. 09/442,960 filed Nov. 18, 1999 by Dimitrova et al. in, entitled "Method and Apparatus for Audio/Data/Visual Information Selection" (PHA 23,847);

U.S. Pat. No. 6,137,544 and issued Oct. 24, 2000 to Dimitrova et al., entitled "Significant Scene Cut Detection And Frame Filtering For a Visual Indexing System";

U.S. patent application Ser. No. 09/818,303 filed a Mar. 27, 2001 by Dimitrova et al. entitled "Automatic Video Retriever Genie" (US010079);

U.S. patent application Ser. No. 09/370,931 filed Aug. 9, 1999 by Agnihotri et al. entitled "System And Method For Analyzing Video Content Using Detected Text In Video Frames";

U.S. patent application Ser. No. 09/351,086 filed Jul. 9, 1999 by Dimitrova entitled "Method and Apparatus for Linking a Video Segment to Another Video Segment or Information Source";

U.S. patent application Ser. No. 09/372,959 filed Aug. 12, 1999 by Schaffer entitled "Customizing Database Information Presentation with Media Selections"

U.S. patent application Ser. No. 09/712,681 filed Nov. 14, 2000 by Agnihotri et al. entitled "Method and Apparatus for the Summarization and Indexing of Video Programs Using Transcript Information" (US 000279)

U.S. Ser. No. 10/028,299, filed Dec. 24, 2001, by Dimitrova et al., entitled "Personal Adaptive Memory System" (US 010671).

BACKGROUND OF THE INVENTION

A. Field of the Invention

The invention relates to the field of processing multimedia content.

B. Related Art

The present application is an improvement upon U.S. patent application Ser. No. 10/028,299 filed Dec. 24, 2001. That application taught accumulation of content based on personal information; facts derived from content experienced by at least one relevant user; and facts derived from the relevant user's behavior. That application also taught filtering content prior to storing excerpts from it and formulating queries based on the accumulated content.

Additional methods of automatically acquiring supplemental information relevant to a user, based on stored information, would still be desirable.

SUMMARY OF THE INVENTION

It would be advantageous to allow data to accumulate over time, as it becomes available, relating to user preferences. Data can be viewed as being subject to a "precipitation" process over time and/or being subject to a "dissolution" process as it becomes less interesting to the user.

Objects and advantages will become apparent the following.

BRIEF DESCRIPTION OF THE DRAWING

The invention will now be described by way of non-limiting example with reference to the following drawings.

DETAILED DESCRIPTION OF THE PREFERRED EMBODIMENTS

Figure 1A:
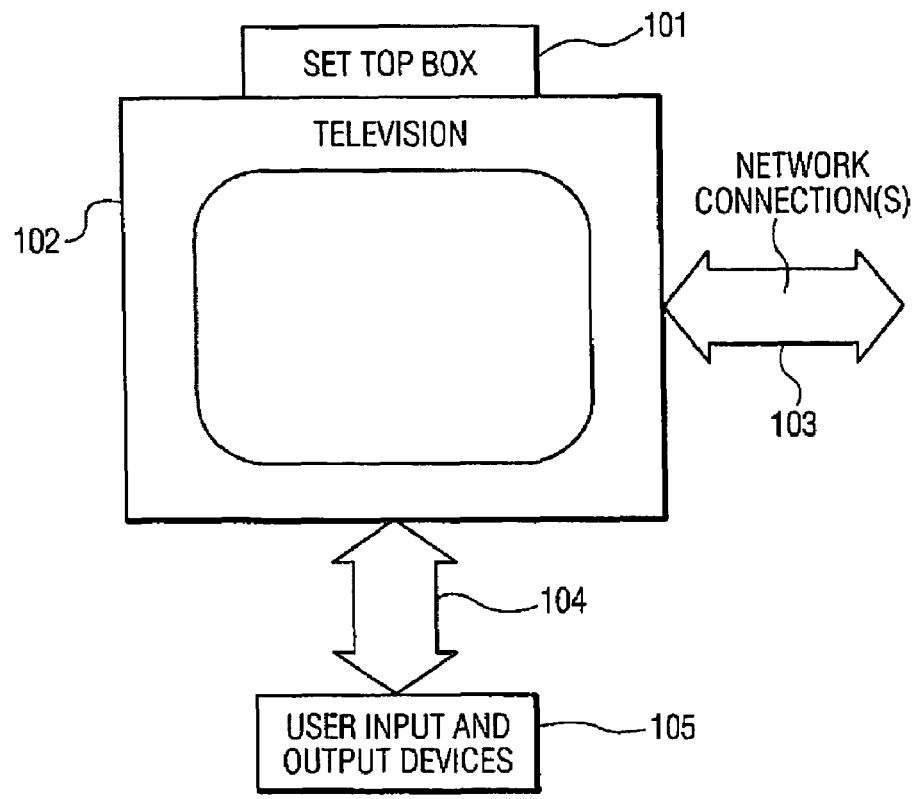
FIG. 1a shows a system in which the invention can be used.

FIG. 1a shows a system for interactively experiencing multimedia information. The system includes one or more set-top boxes 101, a television 102, network connections 103, user communication channels 104, and user input and output (I/O) devices 105.

The network connections 103 may include one or more of: an antenna coupled to receive programming from a terrestrial broadcast network; a television cable connection; an Internet connection; a telephone network type connection; a connection to a local area network (LAN), or any other suitable network connection. The I/O devices 105 may include one or more of: a keyboard, a remote, a pointer device (such as a joystick, mouse, track ball, touchpad, etc.), a printer, loudspeaker, microphone, camera, voice recognition system, or any other suitable user input or output device. The user I/O devices 105 may also include security devices for detecting the user, such as a camera, an ID tag sensor, or a fingerprint sensor.

Figure 1B:
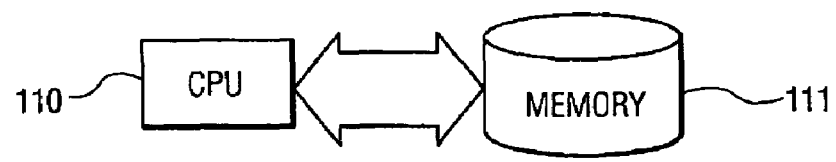
FIG. 1b shows a portion of the inside of the set-top box 101.

The system is illustrated as including a television 102 and a set-top box 101. The set top box preferably has some processing capability complete with storage as shown in FIG. 1b. Alternatively, a PC and monitor could be used in place of the television and set top box—that or any other suitable type of processing device. Normally, this system will include at least one local memory 111 and at least one processor or CPU 110. The processor and memory may be of any suitable type. For instance, the processor may be a digital signal processor. However the system may also make use of remote processing and memory facilities. The memory can be used for storing code and/or data and can include electronic, magnetic, optical or any other type of medium. There may be more than one processor. Typically there will be several memory devices such as RAM, a VCR, hard drive, DVD device, and so forth. The processor 110 can execute operations specified by code and/or data stored locally or remotely.

The user may receive the invention in the form of a dedicated set top box or software that needs to be installed on a more general purpose box or PC. At installation, the device or software in accordance with the invention should prompt the user for preferences including interests such as keywords, entities, precipitation sources. These preferences will be formatted internally in the form of queries or search structures, illustrated at 502 in FIG. 5. Search structures may be generated initially as in augmented memory in U.S. patent application Ser. No. 09/818,303 filed a Mar. 27, 2001 by Dimitrova et al. entitled "Automatic Video Retriever Genie" (US010079). The search structure of the preferred embodiment here has five fields: category, entities, events, keywords, and precipitation sources. However, those of ordinary skill in the art may readily devise search structures in other formats, such as who, when, why questions in natural language. After generation, initial search structures are stored in database 212 for future use.

Some other examples of search structures generated in accordance with user preferences might be:

Search Structure 1
    Category: US news
    Entities: US President
    Events: Attacks on America Keywords: terrorism
Precipitation sources: http://cnn.com, http://news.bbc-.co.uk/, channel://CNN, channel://MSNBC
Search Structure 2
Category: US news
Keywords: air travel
Precipitation sources: http://cnn.com, http://news.bbc-.co.uk/, channel://CNN, channel://MSNBC
Search Structure 3
Category: Movie
Keywords: James Bond
Precipitation sources: http://imdb.com, http://www.klast.net/bond/, channel://SUPERSTATION
Search Structure 4
Category: Comedy
Entities: Actor—Mike Myers
Precipitation sources: http://imdb.com, channel://E!

As can be seen from these examples, not all the fields in the search structure need necessarily be used.

As used herein, the term "content" can include any type of content, such as multimedia, video, audio, and text. Content may be a "program" produced by an external source or a combination of programming and augmented content assembled locally to the user.

While the illustration shows a receiving device for implementing the invention, the CPU and processor of FIG. 1b might also be located on the premises of a content provider, such as on a network server or at a cable head-end. The content provider can maintain a profile for supporting the precipitation process described below.

Figure 2:
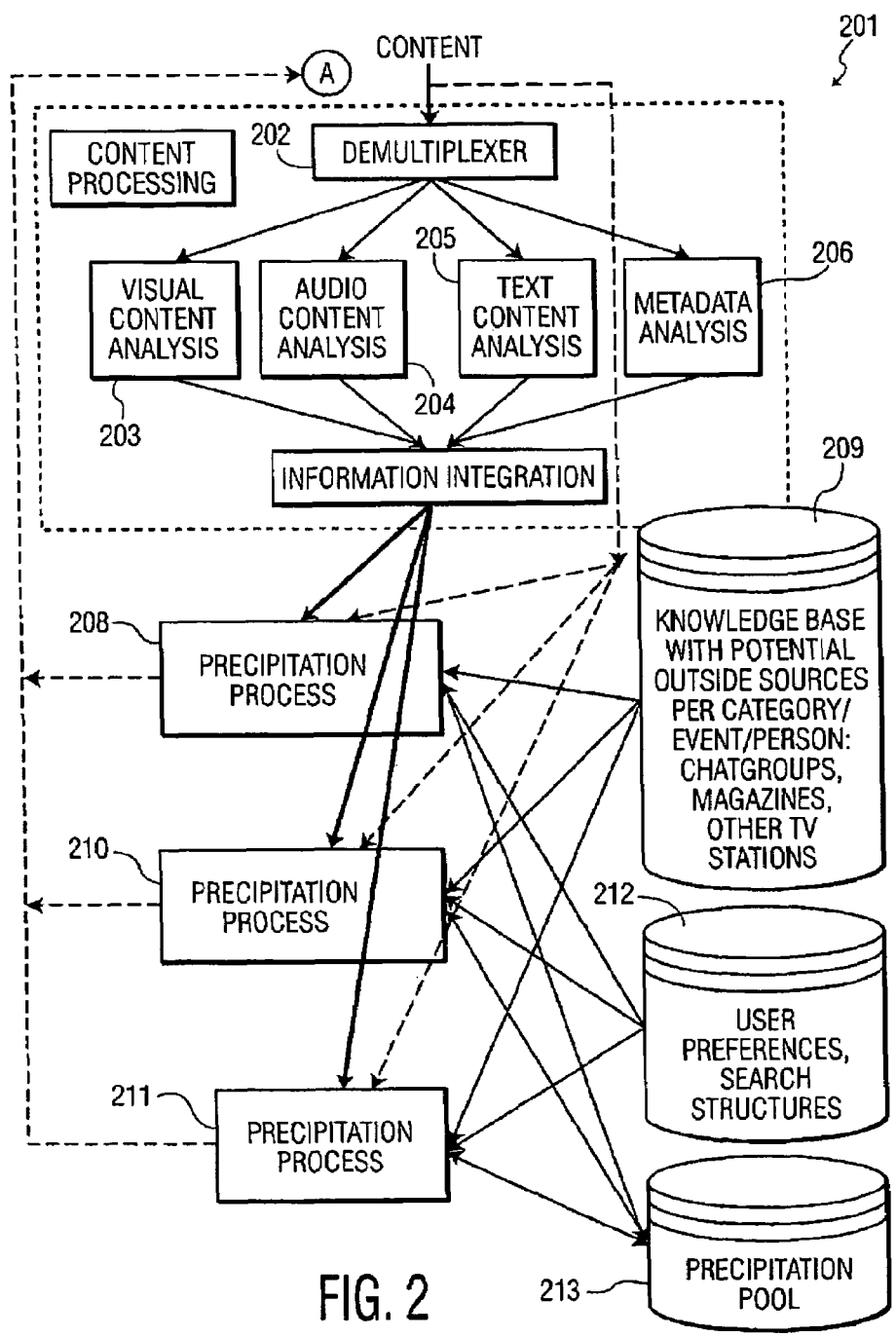
FIG. 2 shows operation of the invention.

FIG. 2 shows information relating to operations of the invention.

Content from the network connections 103 streamed to A. The stored content receives an initial processing within box 201.

At 202 an MPEG type demultiplexer demultiplexes content into data components such as visual, audio, text, and metadata.

Visual content is analyzed at 203. Examples of such analysis are given in U.S. Pat. No. 6,137,544 issued to Dimitrova et al. Oct. 24, 2000, entitled "Significant Scene Cut Detection and Frame Filtering for a Visual Indexing System", and EP 1066577 A1 by Agnihotri et al., entitled "System and Method for Analyzing Video Content Using Detected Text in Video Frames" Published Aug. 3, 2000, which is a counterpart of U.S. patent application Ser. No. 09/370, 931 filed Aug. 9, 1999. The result of such analysis will be a classification of visual information experienced by the user.

At 204, audio content is analyzed. An example of such analysis can be found in Li et al., "Classification of General Audio Data for Content-Based Retrieval", Pattern Recognition Letters 2001. The result of such analysis will be a classification of audio information experienced by the user.

At 205, text content is analyzed. An example of such text content analysis can be found in U.S. patent application Ser. No. 09/712,681 filed Nov. 14, 2000 by Agnihotri et al. entitled "Method and Apparatus for the Summarization and Indexing of Video Programs Using Transcript Information" (US 000279);

At 206, metadata, such as electronic program guide information and genre information, are analyzed.

All of the combined analyses are integrated at 207. An example of such integration is found in U.S. patent application Ser. No. 09/442,960 filed Nov. 18, 1999 by Dimitrova et al., entitled "Method and Apparatus for Audio/Data/Visual Information Selection".

The output of box 201 will be an annotated piece of content. The annotations could contain positions and enumerations of human faces, annotations of music, commercial break parts, and annotation for laughter, applause, etc. Once box 201 determines that an entire content segment or show has been received, it spawns a precipitation process 208, 210, 211. Several precipitation processes may exist at a single time, because they may be working on different pieces of content. The apparatus may receive several pieces of content simultaneously over different channels, or the precipitation processes may simply be left over from earlier transmitted content.

Each precipitation process interacts with the knowledge base 209, user preferences and search structures 212 and a precipitation pool 213.

Figure 3:
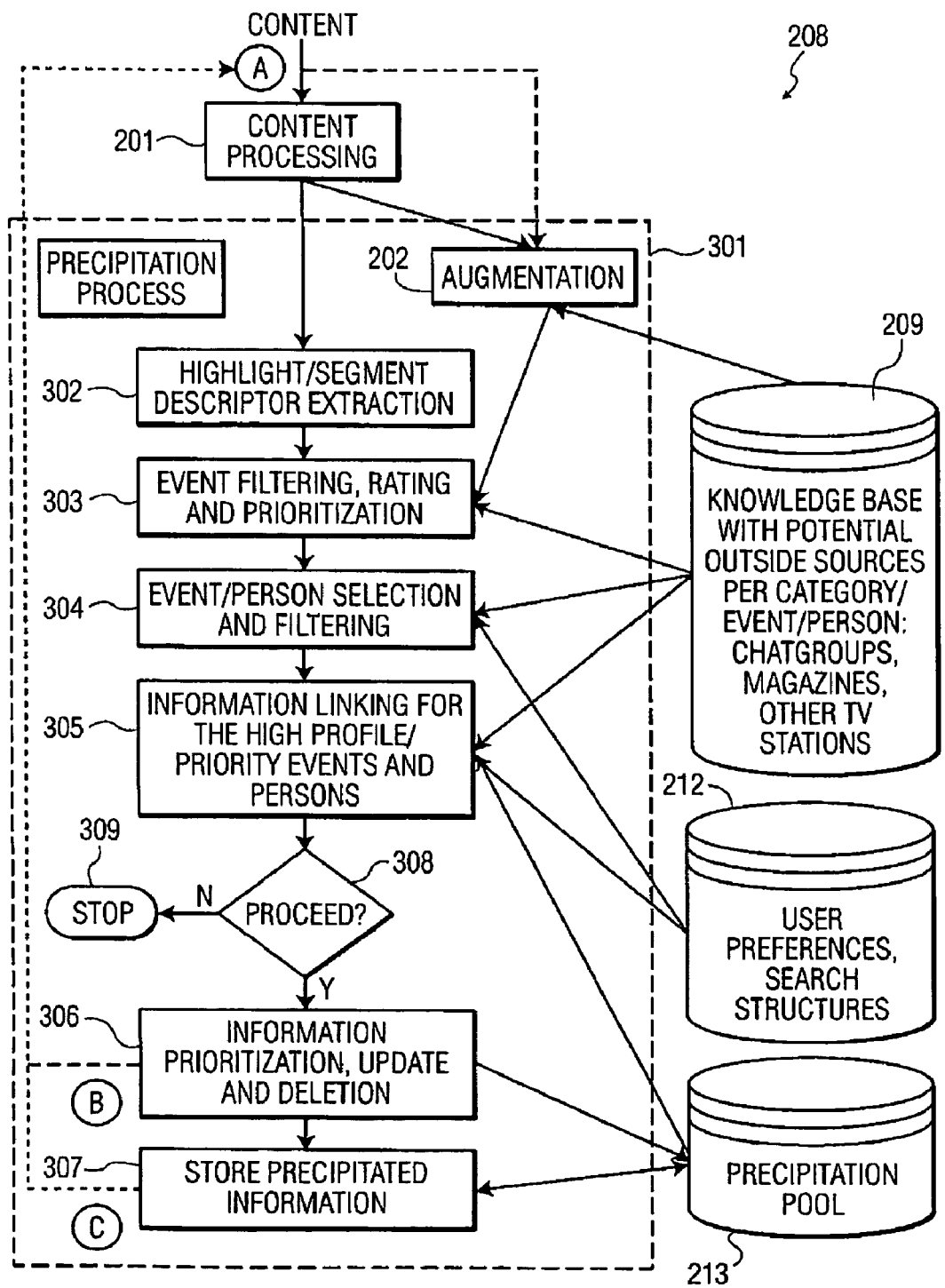
FIG. 3 shows another view of FIG. 2, with different details

FIG. 3 shows a different view of the diagram of FIG. 2. In this case, box 201 is shrunk down to a single box, while box 208 is expanded to show its contents and how they interact with stored data. Boxes 210 and 211 are not shown in order to give more space on the page. Each precipitation process 208, 210, 211 is operationally equivalent to the others, though each one is processing a different set of data.

Each precipitation process contains an augmentation sub process 301 which takes data from the knowledge base 209 and from the content stream as processed at 201. Augmentation is described in: U.S. patent application Ser. No. 09/818, 303 filed a Mar. 27, 2001 by Dimitrova et al. entitled "Automatic Video Retriever Genie" (US010079); Long term memory about user's preferences and augmentation history is described in: U.S. Ser No. 10/028,299, filed Dec. 24, 2001, by Dimitrova et al., entitled "Personal Adaptive Memory System" (US 010671).

The rest of the preferred precipitation process includes six main steps:
Highlight/segment descriptor extraction 302;
A first, objective filtering step 303;
a second, subjective filtering step 304;
Information linking with high-profile/priority events and persons 305,
Initial precipitation and memory management 306; and
Augmented precipitation and memory management 307.

While these steps are shown as a sequence of single pass operations, alternatively, one of ordinary skill in the art may devise alternative algorithms involving looping to survey stored content or performing operations in parallel on different parts of the content.

Step 302: Highlight/Segment Description Extraction

This operation automatically finds highlights in and segments the content. Segmentation of the transmitted content or program involves breaking it into pieces that contain stories. This can be accomplished using a system like the Video Scout for content segmentation and selection based on content-based analysis and retrieval techniques. Video Scout is described in U.S. Pat. application Ser. No. Serial No. 09/442, 960, filed Nov. 18, 1999, "Method and Apparatus for Audio/ Data/Visual Information Selection", Nevenka Dimitrova, Thomas McGee, Herman Elenbaas, Radu Jasinschi, Lalitha Agnihotri, Serhan Dagtas, Aaron Mendelsohn, (PHA 23,847). The system is also described in: R. Jasinschi, N. Dimitrova, T. McGee, L. Agnihotri, and J. Zimmerman, "Video Scouting: an Architecture and System for the Integration of Multimedia Information in Personal TV Applications", Proceedings of International Conference on Acoustics, Speech, and Signal Processing, Salt Lake City, 2001. The system of that application looks at audio, video and transcript to find sections that are complete in themselves. For video, the system looks for a consistent color palette, similar background, and similar faces within the previous constraints. For transcript, cues in the transcript such as ">>" and ">>>" can be used along with analysis to find if there is a common thread being talked about in a given section. Similar analysis can be performed for audio to find highlights.

At the end of step 302, there is information necessary to determine what the segment is about. For example, content might be chopped into five pieces: monologue, introductory segment, guest 1, guest 2, musical guest. In addition, all segments will be annotated for location, topic, and genre; so the output of 302 (i.e. the input of 303) is a collection of segments each containing the existing annotations from 201. Some segments may be dropped at this point. For example, commercial breaks might be dropped or annotated so that they will be ignored.

Step 302 may also be performed by a content creator or broadcaster, and the segment descriptors may be incorporated in the content received at A. Segment descriptors will be explained in further detail with reference to step 304 and FIG. 4.

The augmentation process 301 can act as an alternative pathway to 302. Where the content already has highlights annotated and is already segmented, the augmentation process can directly retrieve supplemental information about the content which can be used to inform filtering in steps 303 and 304. An additional augmentation step may also be inserted after step 302.

Processing the audio, video, and transcript stream for more information augments this information. The system looks for named entities in the transcript. This will help to identify the location (Las Vegas, Hotel Riviera) and the people in the scene (President Bush, Austin Powers). is Words that appear multiple times can be flagged as keywords for a particular highlight.

A category database that contains categories and words associated with it is used to find the category of the segment. Face recognition may be performed to find the people who are present in the story. Object recognition to identify the objects in the scene may also be performed. Audio analysis may be performed to identify any music. Examples of the type of processes which can occur here are given in L. Agnihotri et al., "Summarization Of Video Programs Based On Closed Captioning" SPIE Conference On Storage And Retrieval In Media Databases, San Jose Calif., January 2001, pp. 599-607; and D. Li et al., "Fusion Of Visual And Audio Features For Personal Identification In Real Video", SPIE Conference On Storage And Retrieval In Media Databases, San Jose Calif., January 2001.

Preferably, the segmentation and highlighting will be done so as to make annotations of content into a structure that is analogous to that of the search structure. This annotated content structure is shown for the preferred embodiment at 501 in FIG. 4.

Steps 303 and 304: Event/person Filtering, Rating, Selection and Prioritization

These operations select topics, facts, people's names, and the like.

A distinction is made herein between "Event filtering, rating and prioritization" 303 and "Event/person selection and filtering" 304.

The first filtering 303 is of an objective sort, i.e. one that does not depend on user preferences. Typically this will be at the program (content) level because it is preferable to filter is events and prioritize within the program. This module will also further chop the content, removing parts that are not of interest. For example, if a segment is found to be just an announcement of the next three segments (e.g. as in headline News), then that segment may be dropped.

Objective filtering 303 may also mark certain segments as probably not of interest. Such segments might not be dropped immediately, but might be dropped later if subjective filtering 304 also considers them not of interest. For instance, during the Academy Awards—a four plus hour program—it would probably not be meaningful to try to precipitate from every identifiable person or movie mentioned within the program. One heuristic for narrowing down what to look at would be to only look at this year's winners and their corresponding story segments. Nevertheless, the user may have a particular interest in some person who lost or acted as a presenter. Therefore it might be advantageous to mark information about each participant in the program as probably not of interest, to be dropped later if definitely not of interest.

Step 303 might also be used to identify significant emergency events such as photographs of the user's town being destroyed by a tornado and give these a higher priority.

Segments output by 303 are prioritized based on factors such as length, topic, popularity, etc. Thus, the output of 303 is a reordered subset of the segments from 302. In addition, the segments are additionally annotated with information that was obtained about them in the process of filtering and prioritizing.

The second filtering step: "Event/person selection and filtering" 304 uses the personal profile in order to select and filter out the story segments that are relevant to the user preferences. Content filtering in accordance with user preferences is described in more detail in U.S. Ser No. 10/028,299, filed Dec. 24, 2001, by Dimitrova et al., entitled "Personal Adaptive Memory System" (US 010671). For example, if the user has a preference for European news, newsclips that refer to locations in Europe are ranked higher than those that don't. Other preferences are taken into account such as the user's interest in particular groups of people (e.g. athletes, actors, or directors), an event types (e.g. war, economy, movie/music awards, etc.). Based on these, some of the sub-segments may be dropped, because they do not match the user profile in any way; while the rest will again be re-ordered and annotated with more information. Determining which items to drop may result from taking some kind of an average between priority values established in accordance with step 303, on the one hand, and in accordance with user preferences, on the other hand. Annotations may include which user preferences were used to rank/select the sub-segment.

Operations 303 and 304 preferably operate by further annotating content, supplemental to the operations of box 302. Thus, box 302 annotates content by dividing it into significant topics and/or segments. Box 303 does an objective prioritization and annotates certain content items as being objectively important. Box 304 then annotates certain content items as being of user interest.

Boxes 302-304 might be implemented as increasingly fine filtering operations. Alternatively, boxes 303 and 304 might each provide an independent assessment of the importance of a particular item. What happens in boxes 302-304 is largely a matter of design choice. Whatever segmentations or annotations make sense to the designer should be implemented.

Step 305: Matching Segment Descriptors to Search Structures

The input to 305 is the set of annotated sub-segments of the original content. This module will format the annotations into structures like 501 of FIG. 4 and try to match these derived against a search structure 502 as shown at 511 There may be multiple structures like 501 derived from the same sub-segments. For example, a news story could be about the war on terror, but could also be about the FBI or government restructuring.

Each segment description successfully matched with a search structure, together with the description of the match (practically the union of the segment descriptor and the search structure), may be further processed and eventually added to the precipitation pool.

In box 305, some more information may be added to the results of filtering. For instance, if all that is specified in the content is a player number or a player's last name, the player's full name can be retrieved from the knowledge base 209.

Based on the annotations, the system can automatically generate further search structures. For example, two segments from CNN Headline news and the movie "Austin Powers—International Man of Mystery" could be described with the following two structures:

"CNN—House to vote on airport security" could be described with:
 Category: US/News/Crime/Terrorism, US/News/Travel/Air
 Entities: U.S. House of Representatives, US President, George W. Bush, airport security bill,
 Events: Attacks on America
 Keywords: US, politics, terrorism, crime, air travel
Segment of "Austin Powers—International Man of Mystery" (Scene 3: Arrival in Las Vegas) described with:
 Category: Movie, comedy, parody,
 Entities: Song (Soul Bossa Nova—Quincy Jones And His Orchestra), Actor: Mike Myers, Character Austin Powers, Car: E-type Jaguar, Location: Las Vegas USA, Location: Hotel Riviera
 Keywords: James Bond, Las Vegas In the above, two examples of search structures are given. These structures use fields, though, as stated before, one of ordinary skill in the art might readily devise other structures, such as natural language questions.

Search structures that are generated by the system should be placed in the precipitation pool 213, indicating that they can be modified later. Search structures that are generated directly from user input should be stored in the user preference database 212 so that they are not alterable by the system as a result of content processing. Both types of search structures can be used in matching 305.

If there are no matches, then at 308 and 309, this particular precipitation process will terminate.

Steps 306 and 307: Precipitation Update and Maintenance

At 306, some information is precipitated based on what has been filtered and matched. At 306, database maintenance on the precipitation pool also occurs to reorganize the database or delete items that are no longer of interest or inaccurate. Some of the precipitated items may also be made into search structures and stored for further use. The dotted line in branch B does not indicate an actual loop or branch. Instead it indicates conceptually that information, e.g. search structures, resulting from precipitation may be used in further processes to precipitate new information.

Box 307 uses information already in the precipitation pool to further augment a previously precipitated item. This augmented information may also be stored as further search structures. The dotted line in branch C also does not indicate an actual loop. Instead it indicates that information resulting from this augmentation may be used in later precipitation processes to precipitate information. Box 307 might also be used to create or alter search structures based on items from the knowledge base 209 or other information sources.

An example for C is a situation when the system finds out, after the Academy Awards program, that "Tom Cruise" and "Nicole Kidman" are actors of interest. The system might then find out that Tom Cruise and Nicole Kidman are divorcing from a tabloid Web site or from the precipitation pool. The system might then create new search structures looking for more information about the two together or their divorce. Based on the newly generated search structures, the system can go back multiple times to different news groups, magazine Web sites, tabloid sites, for more information on the latest news on the status of the divorce.

Each round of precipitation will broaden the scope of precipitation, but it is also likely that some of these branches will point back to the main focus of the precipitation—the initial trigger segment. This happens when one of the branches acquires the same content that triggered it, i.e. points back to itself after a series of precipitations (e.g. from NBC we find a CNN story, then BBC story that leads us to the same NBC story that we started with.) If the system finds that the same item is precipitated more than once, the system can flag that entry as being of particular significance.

User Interface

Ultimately, the precipitation pool will contain numerous entries each with some categories, keywords and popularity associated with it. In addition, each entry points to one or more pieces of content that were used to generate or precipitate the entry. The user is presented with a user interface through which he or she can access the precipitation pool entries for example by creation date, by category, by popularity, by number of content segments, etc. The annotation may or may not be stored or used for this purpose. Advantageously, the annotation may be stored with the content for analysis at later time and/or by other applications. The user interface could also utilize the annotation data by for example highlighting keyword/people/places matches between the annotation and the personal profile.

Figure 4:
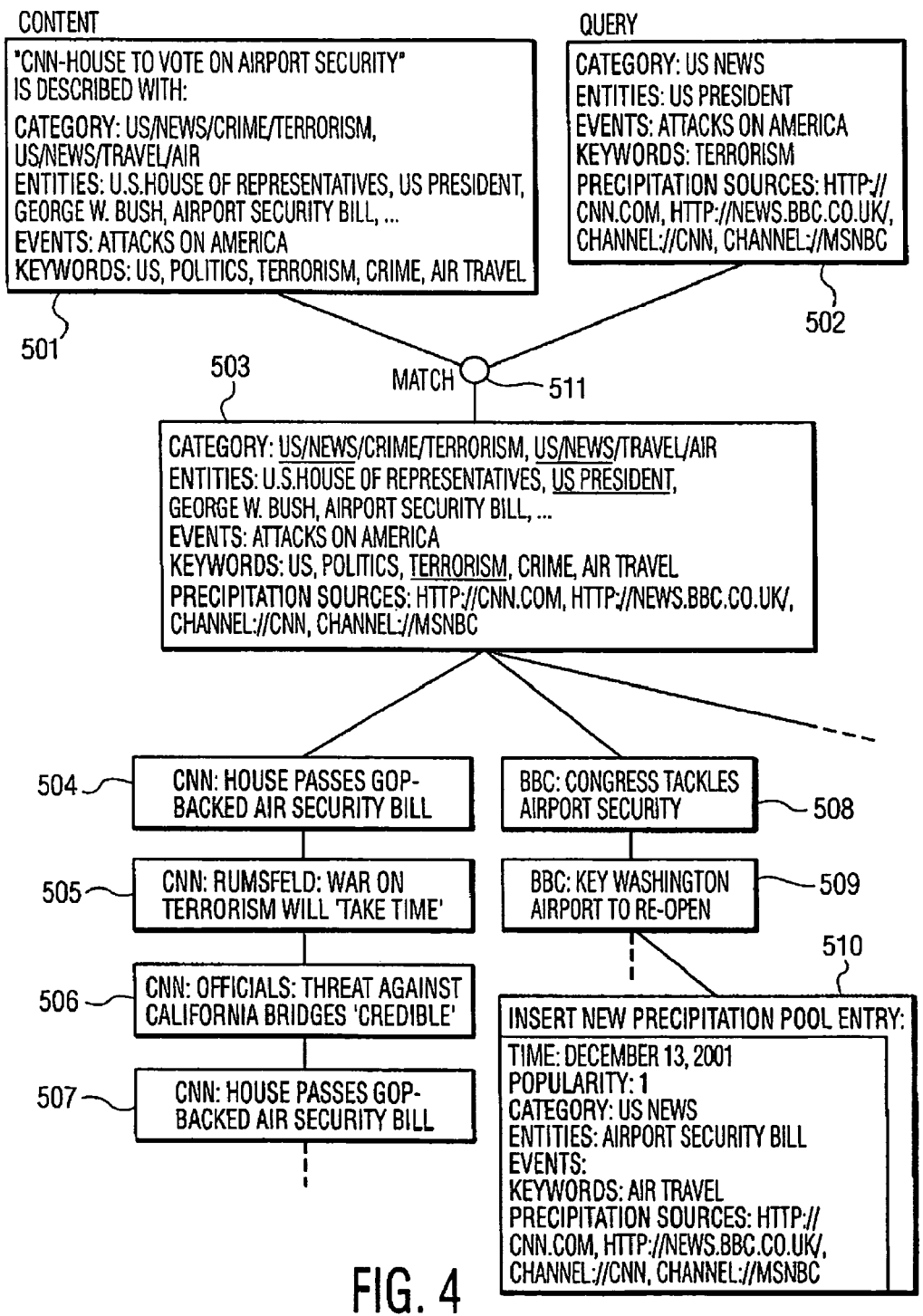
FIG. 4 shows an example of the operation of the invention on data.

FIG. 4 illustrates the results on data from boxes 305 and 306. Box 501 shows a content structure symbolizing a segment and resulting from the operations of boxes 302-305. The content structure in box 501 is as follows:

CNN—House to vote on airport security" is described with:
 Category: US/News/Crime/Terrorism, US/News/Travel/Air
 Entities: U.S. House of Representatives, US President, George W. Bush, airport security bill, ?
 Events: Attacks on America
 Keywords: US, politics, terrorism, crime, air travel
A query or search structure is shown at 502. The search structure has the following form:
 Category: US news
 Entities: US President
 Events: Attacks on America
 Keywords: terrorism
 Precipitation sources: http://cnn.com, http://news.bbc.co.uk/, channel:///CNN, channel:///MSNBCIn accordance with box 305, a matching process occurs at 511.
Box 503 shows a result of the matching process, namely:
 Category: US/News/Crime/Terrorism, US/News/Travel/Air
 Entities: U.S. House of Representatives, US President, George W. Bush, airport security bill . . .
 Events: Attacks on America
 Keywords: US, politics, terrorism, crime, air travel
 Precipitation sources: http://cnn.com, http://news.bbc.co.uk/, channel:///CNN, channel:///MSNBC The structure shown in 503 has approximately the same format as the search structure shown in 502 and the content annotation structure shown at 501. Various types of matching might be used at 511. A match might be found if one of the fields of the search structure matched the content. Alternatively, a search structure might be considered to match only if several fields matched or only if all the fields matched. Plainly, if the search structure has less than all the fields, as in the examples above, the matching process would have to involve no more fields than actually were used in the search structure.

Subsequent to the match at 511, data items

CNN: House passes the GOP-backed air security bill 504,
CNN: Rumsfeld: War on terrorism will "take time" 505,
CNN: Officials: Threat against California bridges "credible" 506,
CNN: House passes GOP-backed air security bill 507,
BBC: Congress tackles airport security 508,
BBC: key Washington airport to re-open 509 are added as precipitates. Items 504 and 507 are duplicates. The precipitation of duplicate items indicates that the information in the items should be marked as of particular importance, e.g. by indicating an increased popularity. The duplicate items should not actually be recorded separately in the precipitation pool, but rather recorded as an indication of priority.

What parts of the matched content are to be precipitated and how they are to be structured is determined in accordance with U.S. patent application Ser. No. 09/818,303 filed a Mar. 27, 2001 by Dimitrova et al. entitled "Automatic Video Retriever Genie" (US010079). Storage structures useful in storing the precipitates are also described in that application. Item 510 shows the format of the data precipitated out by item 509, namely Insert new precipitation pool entry:
Time: Dec. 13, 2001
Popularity: 1
Category: U.S. News
Entities: airport security bill
Events: [empty]
Keywords: air travel
Precipitation sources: hftp://cnn.com, http://news.bbc.co.uk/, channel://CNN, channel://MSNBC Normally a precipitation pool entry would only have one or zero entries for each of the fields, event, entity, or keyword, because the matching process will normally only match one field from a search structure against the content.

The other precipitation data 504-508 would have analogous entries, not shown for reasons of space.

Miscellaneous

Temporal Precipitation Relevance Function

A preferred temporal precipitation relevance function makes the amount of information that the system collects time dependent. Preferably the system collects more related items within the first day of an event (highlight) and collects less and less items as time goes on. After a certain time (based on user's interest) the system can stop precipitating certain content. The preferred temporal precipitation relevance function is:

$$R(x) = \frac{a}{x-b} - c$$

Where x is a time variable and a, b and c are predetermined constants (positive or negative). The constant a determines the speed of the precipitation, while b and c are time offsets—b introduces a delay (e.g. precipitation starts 24 hours after the content was analyzed) while c controls when should the precipitation stop (e.g. 48 hours after the beginning of precipitation).

Preferably this function is used in box 308 to help determine whether to precipitate a matched piece of information. It can also be used in box 306 to delete old information from the precipitation pool as part of database maintenance.

Knowledge Base 209

For a given search structure, the system needs to select the type(s) of media the system should track and search, e.g. other TV channels, news groups, news Web sites etc. and their most likely location (URL, number and time of TV channel from a program guide).

Based on the type of source, category and entity different media are searched for information. For example, for a CNN news story on terrorism, other news web sites are searched. A CNN news story on Brad Pitt causes movie and entertainment web sites to be searched. Additionally, channels such as E-TV and programs such as "Hollywood News" are searched for more information. A highlight in a movie causes the search for an automobile or AAA web-site if the entity that is searched for is a car.

Preferably the knowledge base 209 is implemented partially by information stored locally and partly by information stored remotely and accessible via the network connection. For instance, commonly used information, like the name of the current President of the United States, might be stored locally. Less frequently used information, such as the name of a particular sports figure, might need to be retrieved from the remote storage location From reading the present disclosure, other modifications will be apparent to persons skilled in the art. Such modifications may involve other features which are already known in the design, manufacture and use of user profiling, content analysis, and database maintenance, and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements.

We claim:

1. A method of maintaining and updating stored information comprising executing the following operations in at least one data processing device:

maintaining the stored information as a pool of information potentially of interest to a user;

maintaining a user preference information relating to the pool;

repeatedly identifying a precipitated information for addition to or deletion from the pool, in accordance with at least the user preference information, and a time-dependent precipitation function where the amount of precipitated information identified and added to the pool for a particular query is time-dependent, adding or deleting the precipitated information responsive to said identifying.

2. The method of claim 1, wherein identifying precipitated information for addition to the pool is further responsive to content already in the pool.

3. The method of claim 1, wherein the time-dependent precipitation function specifies an augmentation curve for time-dependent iterative augmentation of precipitated information in response to an initial demonstration of interest by the user.

4. The method of claim 1, wherein the time-dependent precipitation function specifies a dissolution curve for time-dependent iterative dissolution of precipitated information at a given time after an initial demonstration of interest by the user.

5. The method of claim 1, wherein precipitated information is used to generate search structures for matching against future received content.

6. A database embodied in a computer readable medium and produced by at least one data processing device in accordance with the method of claim 1.

7. A computer readable medium having computer readable software instructions for implementing the method of claim 1.

8. A data processing system comprising:
at least one memory embodying data and software according to claim 7;
at least one data processing device for executing the operations specified by the software.

9. A method of maintaining and updating stored information comprising executing the following operations in at least one data processing device:
maintaining the stored information as a pool of information potentially of interest to a user;
maintaining a user preference information relating to the pool;
repeatedly
identifying a precipitated information for addition to or deletion from the pool, in accordance with at least the user preference information, and
a time-dependent precipitation function where the amount of precipitated information identified and added to the pool for a particular query is time-dependent,
adding or deleting the precipitated information responsive to said identifying, wherein the time-dependent precipitation function is $$R(x) = \frac{a}{x-b} - c$$

where x is a time variable and a, b and c are predetermined constants (positive or negative), where the constant a determines the speed of the precipitation, while the constants b and c are time offsets, the constant b introduces a delay while the constant c controls when should the precipitation stop.

10. A method for maintaining and updating stored information comprising executing the following operations in at least one data processing device:

maintaining a pool of information potentially of interest to a user;
maintaining an evolving user preference information relating to the pool; and
launching a plurality of parallel precipitation processes for seeking out additional information for addition to the pool relating to different aspects of an expression of user interest, in accordance with the evolving user preference information; wherein an amount of the additional information added to the pool is time-dependent.

11. A database embodied in a computer readable medium and produced by at least one data processing device in accordance with the method of claim 10.

12. A computer readable medium having computer readable software instructions for causing at least one data processing device to perform operations for maintaining and updating stored information, the operations comprising:
maintaining the stored information as a pool of information potentially of interest to a user;
maintaining a user preference information relating to the pool;
repeatedly
identifying a precipitated information for addition to or deletion from the pool, in accordance with at least the user preference information, and
a time-dependent precipitation function where the amount of precipitated information identified and added to the pool for a particular query is time-dependent,
adding or deleting the precipitated information responsive to said identifying.

13. A data processing system comprising:
at least one medium according to claim 12;
at least one data processing device for executing the operations specified by the software.

14. The computer readable medium of claim 12, wherein identifying precipitated information for addition to the pool is further responsive to content already in the pool.

15. A data processing system comprising:
at least one medium according to claim 14;
at least one data processing device for executing the operations specified by the software.

16. The computer readable medium of claim 12, wherein the time-dependent precipitation function specifies an augmentation curve for time-dependent iterative augmentation of precipitated information in response to an initial demonstration of interest by the user.

17. A data processing system comprising:
at least one medium according to claim 16;
at least one data processing device for executing the operations specified by the software.

18. The computer readable medium of claim 12, wherein the time-dependent precipitation function specifies a dissolution curve for time-dependent iterative dissolution of precipitated information at a given time after an initial demonstration of interest by the user.

19. A data processing system comprising:
at least one medium according to claim 18;
at least one data processing device for executing the operations specified by the software.

20. The computer readable medium of claim 12, wherein precipitated information is used to generate search structures for matching against future received content.

21. A data processing system comprising:
at least one medium according to claim 20;
at least one data processing device for executing the operations specified by the software.

22. A computer readable medium having computer readable software instructions for causing at least one data processing device to perform operations for maintaining and updating stored information, the operations comprising:
    maintaining the stored information as a pool of information potentially of interest to a user;
    maintaining a user preference information relating to the pool;
    repeatedly
        identifying a precipitated information for addition to or deletion from the pool, in accordance with at least the user preference information, and
        a time-dependent precipitation function
    adding or deleting the precipitated information responsive to said identifying, wherein the time-dependent precipitation function is $$R(x)=a/x-b-c$$

where x is a time variable and a, b and c are predetermined constants (positive or negative), where the constant a determines the speed of the precipitation, while the constants b and c are time offsets, the constant b introduces a delay while the constant c controls when should the precipitation stop.

23. A data processing system comprising:
    at least one medium according to claim 22;
    at least one data processing device for executing the operations specified by the software.

24. A computer readable medium having computer readable software instructions for causing at least one data processing device to perform operations for maintaining and updating stored information, the operations comprising:
    maintaining a pool of information potentially of interest to a user;
    maintaining an evolving user preference information relating to the pool;
    launching a plurality of parallel precipitation processes for seeking out additional information for addition to the pool relating to different aspects of an expression of user interest, in accordance with the evolving user preference information; wherein an amount of the additional information added to the pool is time-dependent.

25. A data processing system comprising:
    at least one medium according to claim 24;
    at least one data processing device for executing the operations specified by the software.

* * * * *